United States Patent [19]

Moore

[11] Patent Number: 4,716,677

[45] Date of Patent: Jan. 5, 1988

[54] MANUAL DEVICES AND METHODS FOR SELECTIVE APPLICATION OF CHEMICAL SUBSTANCES TO PLANTS

[76] Inventor: James E. Moore, 555 Riviera Dr., Naples, Fla. 33940

[21] Appl. No.: 844,119

[22] Filed: Mar. 26, 1986

[51] Int. Cl.$^4$ ............................................. A01N 5/00
[52] U.S. Cl. ................................... 47/1.5; 15/210 A; 401/10
[58] Field of Search ....................... 47/1.5; 15/210 A; 401/10

[56] References Cited

U.S. PATENT DOCUMENTS

| | | | |
|---|---|---|---|
| 737,102 | 8/1903 | Holt | 401/10 |
| 1,189,505 | 7/1916 | Stockton | 401/10 |
| 1,454,224 | 5/1923 | Stubfords . | |
| 2,055,314 | 9/1936 | Seburger | 401/10 |
| 2,434,595 | 7/1943 | Hanisch | 15/210 A |
| 2,659,918 | 11/1953 | Stoner | 47/1.5 X |
| 2,788,937 | 4/1957 | Greenberg | 15/210 A |
| 2,819,484 | 1/1958 | Fouse | 15/210 A X |
| 2,908,923 | 10/1959 | Schlechter | 401/10 |
| 2,957,190 | 10/1960 | Stark | 15/210 A X |
| 2,975,520 | 3/1961 | Ericson et al. | 401/10 X |
| 2,988,849 | 6/1961 | Laughlin | 47/1.5 |
| 3,002,319 | 10/1961 | Laughlin | 47/57.5 |
| 3,184,888 | 5/1965 | Furth et al. | 47/1.5 |
| 4,126,962 | 11/1978 | Polcaro | 47/1.5 |
| 4,187,638 | 2/1980 | Hardy et al. | 47/1.5 |

FOREIGN PATENT DOCUMENTS

| | | | |
|---|---|---|---|
| 929758 | 6/1955 | Fed. Rep. of Germany | 47/1.5 |
| 452810 | 5/1968 | Switzerland | 47/1.5 |
| 428721 | 10/1974 | U.S.S.R. | 47/1.5 |

OTHER PUBLICATIONS

Lesco brochure, 1 page (1985).
S. M. Batten, "Those Irrepressible, Incredible, Impossible grassy Weeds!" U.S.D.A. Green Section Record, Sep.-Oct. 1984, pp. 1–4.
"The New Century Super-7 Wick Bar Applicatior," Century Engineering Division, Ex-Cell-O Corp., 221 4th Ave., S.E., Cedar Rapids, Ia. (6/81) (2 pp.).
"Wipe Out Weeds with the New, Improved Walk a Wick"(1 p.).

Primary Examiner—Robert E. Bagwill
Attorney, Agent, or Firm—Richard C. Auchterlonie

[57] ABSTRACT

Hand-held chemical applicators are provided for applying chemicals such as herbicide to selected plants while surrounding plants are shielded from accidental contact. The chemical is forcefully applied by gripping or pressing a selected portion of the plant against an applicator pad containing the chemical. The amount of applied chemical is controlled by variation of the pressure or area of contact between the plant and the pad. Preferably a pair of pads are mounted to the opposing surfaces of the distal portions of pincers or tongs to define an application zone between the pads. Absorbent pads are used for applying liquid chemicals, and chemicals from a pad in the form of a solid bar or cake are applied with the aid of an absorbent pad carrying a solvent and cooperating with the bar or cake. In an alternative embodiment a single applicator pad mounted to a holder is shielded by a resilient flat strip which is deflected by the selected plant to open up an application zone, or alternatively which is normally in an open position and is manually pressed toward the selected plant, and the applicator pad is covered by a cap between periods of use so as to seal a self-contained reservoir of chemical in the holder. The hand-held applicators are also useful for cleaning artificial plants.

9 Claims, 19 Drawing Figures

MANUAL DEVICES AND METHODS FOR SELECTIVE APPLICATION OF CHEMICAL SUBSTANCES TO PLANTS

BACKGROUND OF THE INVENTION

1. Field of the Invention

This invention relates to devices and methods for manual application of chemical substances to selected plants at specific locations thereon.

2. Background Art

Conventional methods of applying chemical substances to vegetation include spraying, sprinkling or sowing solutions or mixtures of the chemicals on the whole plant area. Such "broadcast" methods reduce the desired concentrations on the specific plants to be treated, increase the cost of the chemicals, and subject vegetation far removed from the treatment area to the chemicals due to "drift," "vaporization," "translocation," or "leaching".

To avoid these difficulties associated with the broadcast methods, the individual application of chemicals has been made by hand to selected plants. Selective application has permitted the use of highly potent by relatively safe non-selective herbicides for the control of weeds and other undesirable vegetation. A preferred kind of non-selective herbicide is a 41% solution of isopropylamine salt of N-(phosphonomethyl) glicine, as further described in U.S. Pat. Nos. 3,799,758 and 4,405,531 and sold under the trademark "Roundup" by the Monsanto Company, Agricultural Products Div., St. Louis, Mo., 63167.

Weed control at golf courses has been an especially difficult task. As described by Steve M. Batten in his article "Those Irrepressible, Incredibly, Impossible Grassy Weeds!" USGA Green Section RECORD, September/October 1984 pp. 1–4, millions of dollars are spent annually and thousands hours are devoted to golf course weed control. Weed control methods include scalping, deep-set vertical mowing, turning off irrigation, hand removal, excavation, and starvation by eliminating normal fertilization. Spot application of nonselective herbicide is typically made with hand-held sprayers, plastic squeeze bottles, hypodermic syringes, and paint brushes.

Another known method of spot application is to use a rubber glove having an outer absorbent mitten or sponge which can be dipped in a container of herbicide solution and then wiped against undesired vegetation.

Still another method of manually applying herbicide to selected plants is to use an applicator of the kind having a handle carrying a sponge at the lower end of the handle. In one such kind of applicator, advertised under the trademark "Walk A Wick", an applicator bottle containing a supply of herbicide solution is mounted on the upper end of the handle and is provided with a calibration valve for metering a regulated flow of herbicide from the applicator bottle to the sponge. A particular version designated as "Model 200 Pro Applicator" has a cylindrical sponge which may be provided with an optional shield.

While these method and devices are suitable for applying herbicide to a rather large area of plants by sweeping the applicator or sponge across the undesired vegetation, or to isolated plants by blotting them with the tip of the applicator or sponge, considerable care must be taken to avoid contact with desirable grasses, plants or shrubs as injury may occur. Therefore, these devices are not especially suited for applying herbicide to weeds that are surrounded by and in close proximity to desired plants. Also, the exposed foliage of many kinds of plants is not sufficiently stiff to receive a desired amount of herbicide merely by contact or wiping against an applicator or sponge.

SUMMARY OF THE INVENTION

Accordingly, the primary object of the invention is to provide an herbicide applicator in which the active applicator surfaces are fully shielded from adjacent plants when applying herbicide to a selected plant.

Another object of the invention is to provide a hand-held applicator for applying chemicals to a selected plant by gripping and pressing a portion of the plant against an applicator surface. A related object is to provide such a liquid applicator in which the amount of chemical to be applied can be manually controlled by variation of the applied pressure and the area of engagement between the applicator and the selected plant.

A further object of the invention is to provide a hand-held applicator for applying a solid but soluble chemical to selected plants, in order to avoid handling solutions of the chemical.

Yet another object of the invention is to provide a hand-held applicator for applying chemicals to selected plants which ensures against accidental contact or release of the chemicals.

Briefly, according to an important aspect of the invention, a fully shielded hand-operated herbicide applicator is provided by an applicator assembly in which an applicator pad is mounted between the distal portions of pincers or tweezers so as to define an application zone for receiving an undesired plant while fully shielding surrounding vegetation. Manipulation of the pincers or tweezers permits variation in the width of the application zone to ultimately provide positive contact between a selected plant and the applicator pad and delivery of substantial amounts of herbicide. To further control the amount of herbicide being applied, the applicator pad can be tapered from the distal tip of the pincers or tweezers.

Preferably for applying liquid herbicide a respective porous applicator pad carrying the liquid is mounted to each of the two elongated members of the pincers or tweezers. But to avoid the handling of chemical solutions, one elongated member may carry a solid cake of soluble herbicide and the other elongated member may carry an absorbent applicator pad carrying a solvent such as water.

The supply of liquid herbicide stored in the applicator can be increased by recessing the applicator pads in pockets or inside the two elongated members of the pincers or tweezers.

For applying highly potent herbicide or other chemicals such as fungicide or insecticide, a shielded applicator is described in the form of a cylindrical handle enclosing a reserve supply of the chemical and carrying a partially enclosed cylindrical applicator pad which is shielded by a resilient flat strip, to define an application zone between the resilient flat strip and the cylindrical applicator pad. For storage purposes, a cap having a portion inserted into the application zone covers the cylindrical applicator and seals the chemical inside the handle.

Although these hand-held applicators are especially suited for applying potent chemicals such as non-selective herbicide to selected plants, they are also useful for selectively applying relatively safe chemicals such as plant food and cleaning agents. Moreover, they are advantageous for cleaning artificial plants by applying water or detergent.

BRIEF DESCRIPTION OF THE DRAWINGS

Other objects and advantages of the invention will become apparent upon reading the following detailed description and upon reference to the drawings, in which.

While the invention has been described in accordance with certain preferred embodiments, it will be understood that the intention is not to be limited to the particular embodiments shown, but, on the contrary, the intention is to cover all modifications, equivalents, and alternatives falling within the spirit and scope of the invention as defined by the appended claims.

DESCRIPTION OF THE PREFERRED EMBODIMENTS

Figure 1:
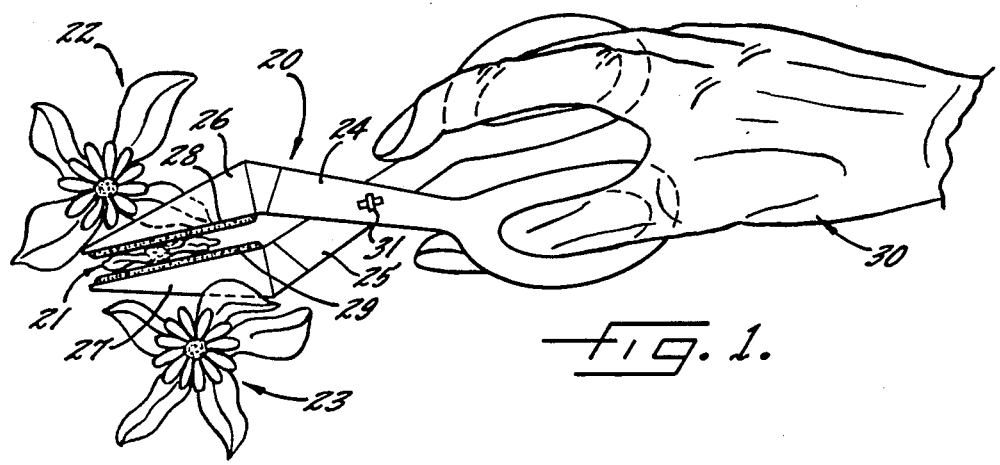
FIG. 1 is a pictorial view of a hand-operated herbicide applicator assembly employing pincers according to one aspect of the invention and which is shown being used to kill a selected plant while avoiding damage to adjacent plants.

Turning now to FIG. 1, there is shown a hand-operated applicator assembly generally designated 20 being used to apply a chemical substance such as non-selective herbicide to selected portions of an undesirable plant generally designated 21 which is surrounded by desired plants generally designated 22 and 23. The applicator assembly 20 is comprised of a pair of pincers or elongated members 24 and 25 which having respective distal portions 26 and 27 to which are mounted respective applicator pads 28, 29 which contain the chemical substance.

Each of the elongated members 24, 25 function as a holder for grasping by a human hand generally designated 30 and as a shield for shielding the surrounding plants 22, 23 from the applicator pads 28, 29. The elongated members 24, 25 are interconnected by a pivot means 31 to permit a variation in the spacing between the distal portions 26, 27 and the respective pads 28, 29 to thereby define an application zone for accepting the selected portions of the plant 21, and also to permit a positive contact pressure to be applied between the applicator pads 28, 29 and the selected portions of the plant 21. Therefore, the amount of chemical applied to the selected portions of the plant 21 can be increased by squeezing the pads 28, 29 closer together by scissors-like movement of the elongated members 24, 25.

Figures 2, 4:
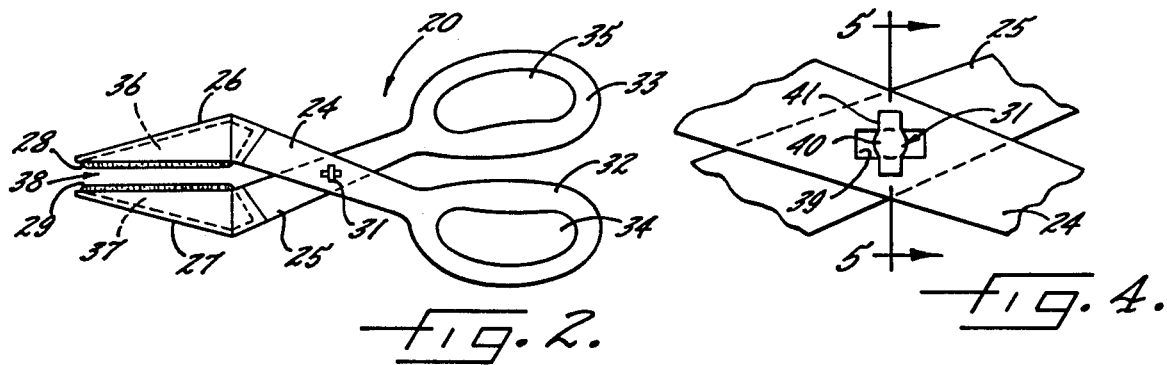
FIG. 2 is a plan view of the applicator employing pincers previously shown in FIG. 1.
FIG. 4 is a detailed plan view of the intermeshing connecting means of the pincer applicator assembly of FIG. 2.
Figure 3:
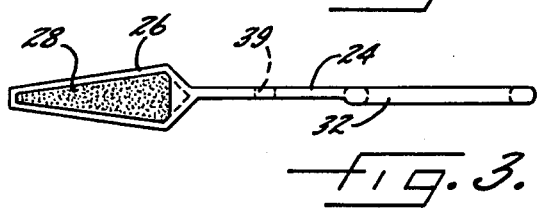
FIG. 3 is a side view of one elongated member of the pincer assembly shown in FIG. 2.

Further details of the applicator assembly 20 are shown in the corresponding top and partial side views in FIGS. 2 and 3 respectively. Each of the elongated members 24, 25 have respective proximal portions 32, 33 defining openings 34, 35 for receiving the thumb and fingers of the operator's hand 30. To increase the supply of chemical contained by the applicator pads, the distal portion 26, 27 of each elongated member 24, 25 has a pocket 36, 37 which receives a substantial portion of the respective applicator pad 28, 29 mounted to the elongated member. But the pads 28, 29 extend into the application zone generally designated 38 so that the amount of chemical applied to the plant (21 in FIG. 1) can be controlled up to a maximum amount as the pads squeeze the plant or touch one another before further squeezing action is limited by contact between the opposing faces of the distal portions 26, 27.

As shown in FIG. 3 for the pad 28, the applicator pads are tapered from the distal tips of the respective distal portions 26, 27 so that selected vegetation in the distal portion of the application zone between the pads is exposed to only a small area of the pads and selected vegetation further within the application zone is exposed to an increasingly greater area of the pads. Therefore, the amount of chemical substance such as herbicide applied to the selected plant can be varied by the positioning of the selected plant within the application zone as well as by the amount of squeezing pressure exerted on the elongated members 25, 26 and thereby exerted on the selected plant by the opposing surfaces of the applicator pads.

For applying a liquid chemical or solution, the pads 28, 29 are made of an absorbent material such as woven fabric, sponge, or preferably open cell polyurethane or polymethyl methacrylate foam. Preferably the pads 28, 29 are adhesively bonded to their respective elongated members 24, 25. The liquid is applied to the pads, for example, by dipping the distal portions of the pads in a container of the solution, and manually operating the applicator assembly to squeeze the pads together to remove excess liquid. Therefore dripping of the liquid will not occur when the applicator assembly is moved among the plants.

Figure 5:
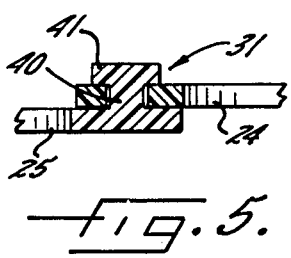
FIG. 5 is a cross-sectional view along line 5—5 of FIG. 4.

So that the elongated members 24, 25 can be easily separated and later reconnected, the pivot connection 31 is provided by a slot 39 in the upper elongated member 24 cooperating with a pin 40 and keeper 41 protruding upwardly from the lower member 25, as more clearly shown in FIGS. 4 and 5. The pin 40 is round, so as to be retained in arcuate portions of the slot 39, but the keeper 41 is rectangular and slightly smaller than the slot 39, so that the elongated members 24, 25 may be separated from each other by a rotation of 90° of one of the elongated members with respect to the other from the position shown in FIG. 2. The keeper 41 and pin 40 are integral with the lower member 25, so that there are no connecting parts to become misplaced. The elongated members 24 and 25 are preferably formed of injection molded thermoplastic resin. Once separated, the elongated members 24, 25 may each function as a hand-held applicator for applying the chemical to selected plants which do not have surrounding plants to be shielded. The separated elongated members, for example, are more easily used to apply non-selective herbicide to weeds growing in the cracks of driveways and sidewalks.

Figure 6:
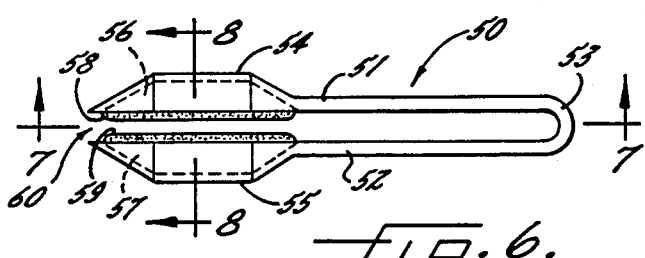
FIG. 6 is a plan view of an applicator assembly employing tweezers or tongs according to another aspect of the invention.
Figure 8:
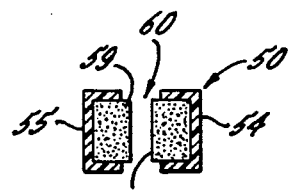
FIG. 8 is a cross-sectional view along line 8—8 in FIG. 6.
Figure 7:
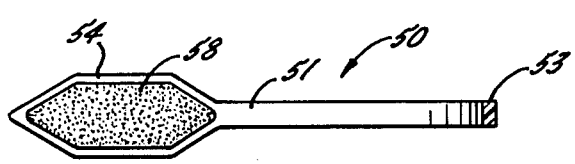
FIG. 7 is a cross-sectional side view along line 7—7 in FIG. 6.

Turning now to FIGS. 6, 7 and 8, there is shown another applicator assembly generally designated 50 which comprises a unitary, U-shaped pair of tongs 51 and 52. The tongs 51, 52 are preferably injection molded from a resilient thermoplastic material such as polymethyl methacrylate. Each of the elongated members 51, 52 has a distal portion 54, 55 formed with a pocket 56, 57 receiving a substantial portion of a respective applicator pad 58, 59 for carrying a chemical substance.

During operation, the proximal portions of the elongated members 51, 52 serve as a handle which is squeezed to vary the spacing between the opposing surfaces of the applicator pads 58, 59. To apply a chemical such as non-selective herbicide, the applicator assembly 50 is moved to place a selected plant (not shown) within an application zone 60 between the opposing surfaces of the applicator pads. Then, the proximal portions of the elongated members 51, 52 are manually squeezed to press the applicator pads together and thereby deposit the chemical on the selected plant.

As illustrated in FIG. 7 for the pad 58, the applicator pads are tapered from the distal tips of the respective distal portions 54, 55 so that selected vegetation in the application zone 60 near the distal tips is exposed to only a small area of the applicator pads 58, 59, and selected vegetation further within the applicator zone is exposed to an increasingly greater area of the applicator pads. Therefore, the amount of chemical substance such as herbicide applied to a selected plant can be varied by the positioning of the selected plant within the application zone as well as by the amount of squeezing pressure exerted on the elongated members 51, 52 and thereby exerted on the selected plant by the opposing surfaces of the applicator pads.

Figure 9:
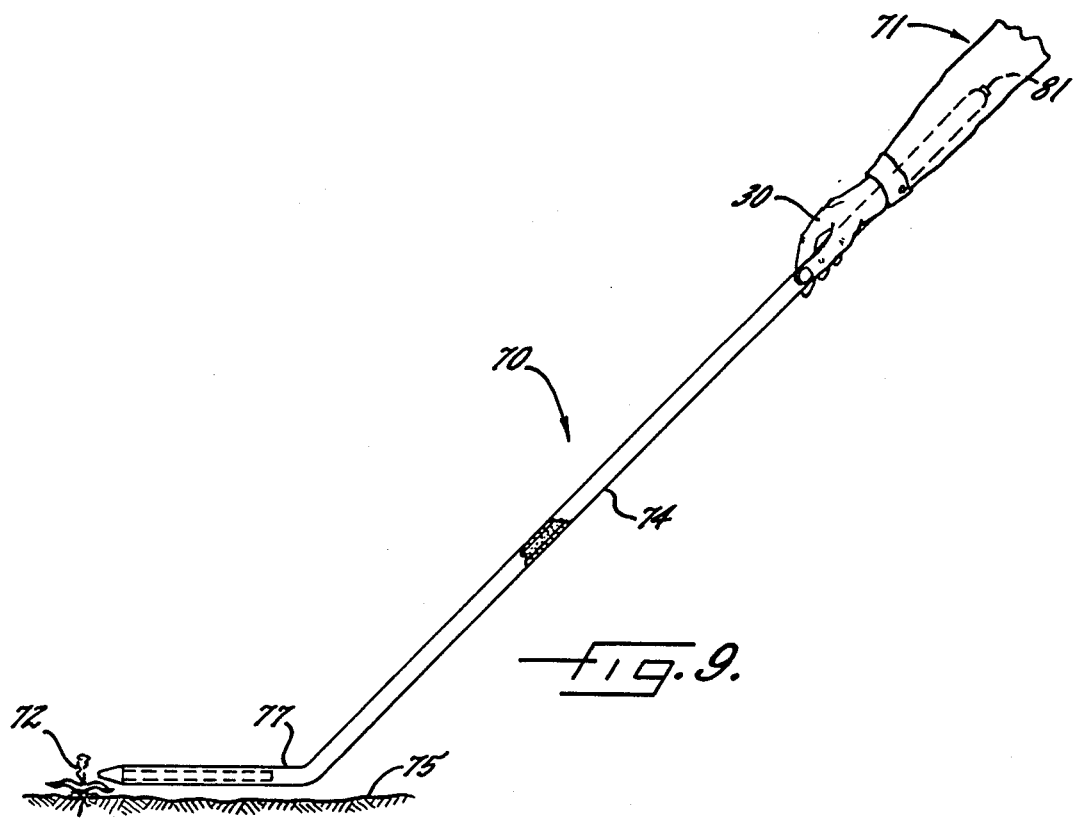
FIG. 9 is an elevation view of an applicator assembly employing tongs which has an elongated handle means for permitting a person standing upright to apply herbicide to a plant at ground level.
Figure 10:
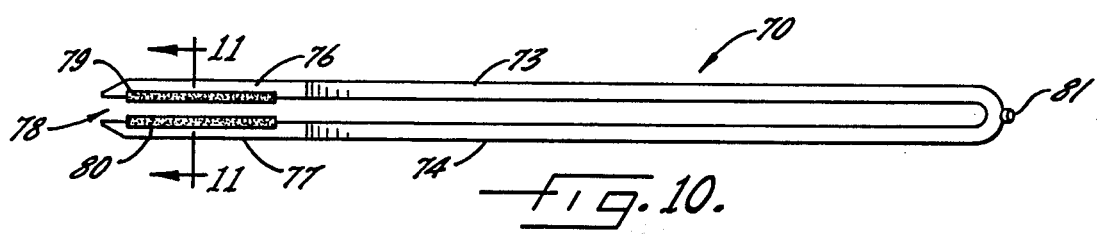
FIG. 10 is a plan view of the applicator assembly of FIG. 9.
Figure 11:
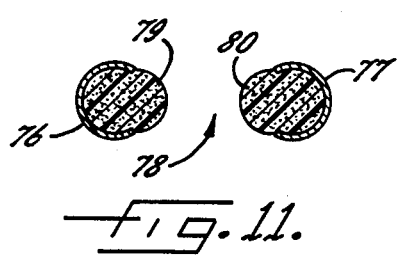
FIG. 11 is a cross-sectional view along line 11—11 in FIG. 10.

Turning now to FIGS. 9, 10, and 11 there is shown a third kind of applicator assembly generally designated 70 which is particularly useful to allow a human operator 71 standing erect to apply a chemical substance to a selected plant 72 at ground level. The applicator 70 includes a unitary pair of tongs having elongated members 73, 74 that are long enough to extend from the ground 75 to the hand 30 of the operator 71 standing upright. Preferably the elongated members 73, 74 are bent so as to have distal portions 76, 77 at an obtuse angle with respect to the proximal portions of the members so that when the distal portions are horizontal with respect to the ground, as shown in FIG. 9, the proximal portions of the elongated members are inclined upward to operator's hand 30. The obtuse angle, for example, is preferably about 135°.

As more clearly shown in FIGS. 10 and 11, the elongated members 73, 74 are parallel spaced and are made of a resilient material so that the operator may control the spacing between the distal portions 76, 77 by manually squeezing the elongated members together.

To define an application zone generally designated 78 for receiving a portion of a selected plant, applicator pads 79, 80 carrying a chemical substance are mounted to the respective distal portions 76, 77. Preferably the elongated members 73, 74 are tubular and the applicator pads 79, 80 are absorbent wicks which extend inside the elongated members. The elongated members, for example, are made of a resilient aluminum alloy and the applicator pads are made of nylon rope wicks. In the region of the distal portions 76, 77, the rope wicks protrude outward from parallel spaced and adjacent openings in the distal portions so that the adjacent surfaces of the applicator pads 79, 80 will touch and be compressed when the distal portions are squeezed together. To facilitate the deflection and shielding of surrounding plants (not shown), the distal tips of the distal portions 76, 77 are beveled or tapered.

The rope wick forming the applicator pads 79, 80 may extend throughout the entire tube forming the elongated members 73, 74 to provide a large reservoir for liquid chemical to be applied to the selected plants. The liquid chemical may be introduced via a proximal opening normally closed by a threaded plug 81.

Figure 12:
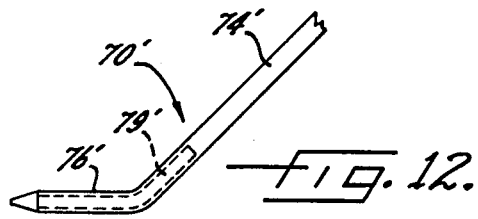
FIG. 12 is a partial elevation view showing a modified version of the applicator of FIG. 9 which has applicator pads extending further up the handle means.
Figure 13:
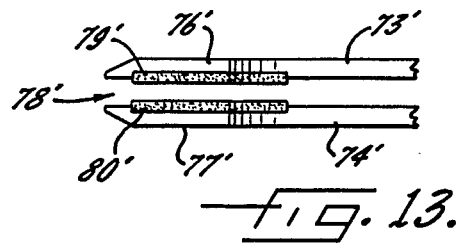
FIG. 13 is a plan view corresponding to FIG. 12.

Turning now to FIGS. 12 and 13, there is shown a modified version generally designated 70' of the applicator assembly 70 of FIGS. 9 and 10. In order to provide a more extensive application zone 78' and to facilitate operation of the applicator assembly in an elevated horizontal position, such as above a hedge, applicator pads 79', 80' are provided which extend part way up the proximal portions of elongated members 73', 74'. It should be understood that the components which are similar between FIGS. 12, 13 and FIGS. 9, 10 have the same reference numerals but the reference numerals are primed in FIGS. 12 and 13.

Figure 14:
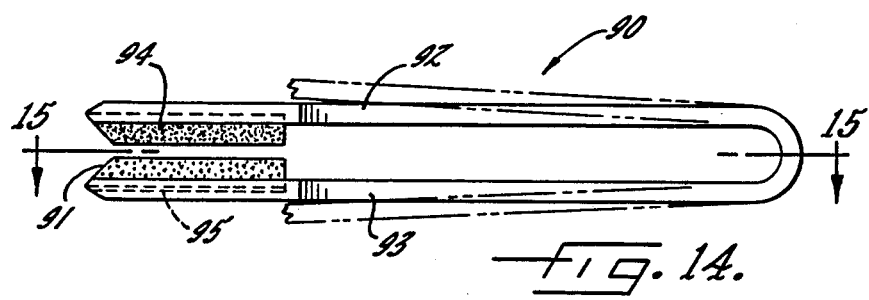
FIG. 14 is a plan view of an applicator assembly employing tongs which has a solid herbicide bar adjacent to an absorbent sponge containing water for dissolving the solid herbicide.
Figure 15:
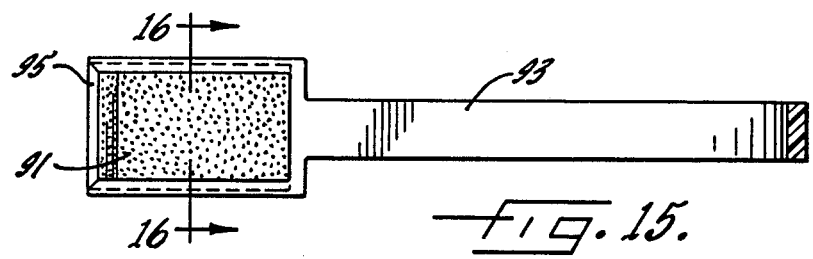
FIG. 15 is a cross-sectional view along line 15—15 in FIG. 14.
Figure 16:
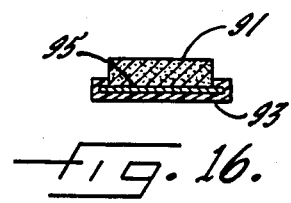
FIG. 16 is a cross-sectional view along line 16—16 in FIG. 15.

Turning now to FIGS. 14, 15 and 16 there are shown various views of still another applicator assembly generally designated 90 which is especially suited for applying a chemical substance provided in the form of a solid bar or cake 91. The applicator assembly 90 has a unitary and resilient pair of tongs including elongated members 92, 93 which are normally in the spaced positions shown in phantom lines but which become parallel as shown when manually squeezed together. As shown, the solid cake or bar 91 is mounted to the distal portion of the elongated member 93 opposite from an absorbent applicator pad 94 mounted to the distal portion of the elongated member 92. Therefore, the distal portions of the elongated members may shield surrounding vegetation (not shown).

During operation, the applicator pad 94 is moistened with a liquid capable of dissolving some of the chemical from the solid bar 91 when the pad is brought into contact with the bar by manually squeezing the two elongated members together. When the pad 94 is released from the bar 91, the opposing surfaces of the pad and bar will contain a solution or film of the chemical dissolved by the liquid solvent. Therefore, the dissolved chemical can thereafter be applied to a selected plant in the same manner as the applicator 50 of FIGS. 6–8 by bringing the plant into the application zone between the pad and bar and pressing the opposing surfaces of the pad and bar against the plant. For applying herbicide, for example, the bar is a cake of solid non-selective herbicide, and the absorbent pad 94 is dampened with water or an aqueous detergent solution.

By applying herbicide from a solid cake, the possibility of accidental spillage is eliminated and also the handling and storage requirements for the herbicide are reduced because the solid form of herbicide is more concentrated. To provide for replacement of the solid bar or cake 91 after it has almost been completely dissolved, the bar or cake 91 is mounted on a flat planar base 95 which is received in a complementary and tight-fitting slot formed in the distal portion of the elongated member 93. When the bar 91 has been consumed, the base 95 is withdrawn and a new base carrying a fresh bar is inserted in the slot.

Figure 17:
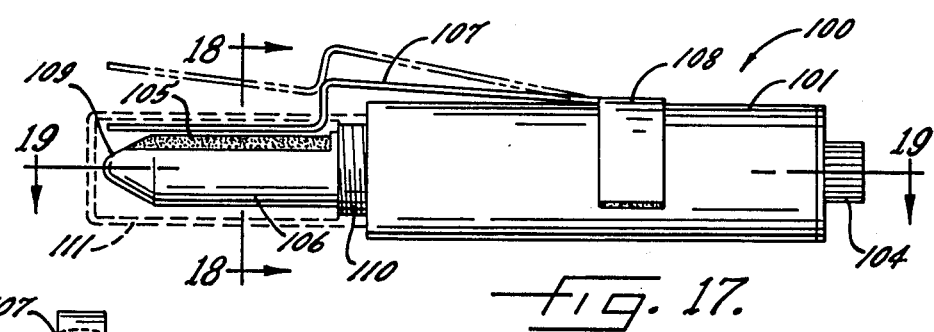
FIG. 17 is a plan view of a cylindrical applicator assembly having a self-contained supply of herbicide and which can be sealed for storage and shipment.
Figure 18:
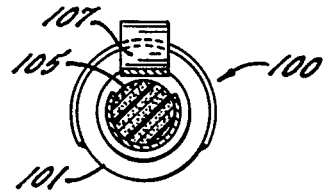
FIG. 18 is a cross-sectional view along line 18—18 in FIG. 17.
Figure 19:
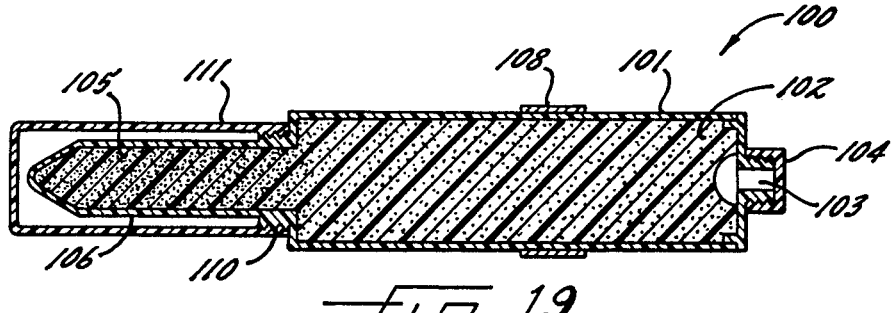
FIG. 19 is a cross-sectional view along line 19—19 in FIG. 17.

Turning now to FIGS. 17, 18 and 19, there is shown an applicator assembly generally designated 100 that can be shipped and stored with a self-contained supply of chemical substance. For this purpose the applicator assembly has a hollow handle 101 containing absorbent material 102 such as open cell polyurethane foam or absorbent wick which is dampened with a solution of the chemical substance. The solution is added or replenished through an opening 103 normally sealed by a threaded cap 104. Alternatively, a solid bar or cake of the chemical substance (not shown) could also be enclosed within the handle 101, and the absorbent material 102 could be initially charged and periodically recharged with a solvent. In either case, the applicator 100 would permit relatively safe handling of highly potent herbicide or other chemicals such as fungicide or insecticide.

In order to selectively apply the chemical substance to a chosen plant (not shown) without application to surrounding plants (not shown), the applicator assembly 100 includes an applicator pad 105 partially covered by a cylindrical shield 106 preferably integrally formed as a distal portion of the handle 101. Preferably the applicator pad 105 is integral with the absorbent material 102 within the handle. To completely shield the applicator pad 105, there is also provided a resilient flat strip 107 fastened to the handle 101 by a clip portion 108.

For applying the chemical substance to a selected plant, the plant is guided by a beveled tip portion 109 of the cylindrical shield 106 so as to move the resilient shield 107 to an open position, for example as shown in phantom lines. Therefore, the space between the flexed shield 107 and the applicator pad 105 defines an application zone and the amount of chemical substance applied to a selected plant can be increased by manually positioning the applicator 100 so that the plant falls further within the application zone. As this is done, the flexed shield 107 exerts an increasing amount of pressure driving the plant into firm contact with the surface of the applicator pad 105. Alternatively, the shield is normally in the open position, and pressure on a plant is applied by manually pressing the shield 107 toward the pad 105.

To completely enclose the applicator pad 105 and to seal the chemical substance within the handle 101, the handle is provided with a threaded portion 110 for engagement with a cylindrical cap 111. Since the applicator assembly 100 can be securely sealed by the caps 103 and 111, the assembly may be conveniently shipped and sold to the customer fully charged with the chemical substance. Also, since the applicator assembly 100 may be economically made from injection molded plastic parts, it could be mass produced at a sufficiently low cost so that it could be discarded when the supply of chemical is exhausted.

In view of the above, hand-held applicator assemblies for applying chemical substances to selected plants have been described in which the active applicator surfaces are fully shielded from adjacent plants. The chemical substance is applied in a selective and forceful manner by gripping and pressing a portion of the plant against an applicator pad. The amount of chemical substance applied to a selected plant is manually controlled by variation of the applied pressure and the area of engagement between the applicator and the selected plant. By using a solid bar or cake of chemical in conjunction with an absorbent pad carrying solvent, the inconvenient handling of dangerous chemical solutions is avoided. Also, an applicator has been described which can be completely sealed between use and is therefore suitable for storing and applying highly potent chemical solutions.

What is claimed is:

1. A hand-operated applicator assembly for applying a chemical substance to selected portions of plants, said applicator assembly comprising at least one holder for grasping by a human hand, an absorbent applicator pad mounted to a distal portion of said holder, and a shield connected to said holder and disposed adjacent to said applicator pad, wherein said pad is disposed between said shield and said distal portion of said holder, and said shield is moveable with respect to said pad to permit variation in the spacing between said shield and said pad to define an application zone between said shield and pad for accepting said selected portions of plants, said applicator assembly further comprising a solid form of said chemical substance which is carried so as to be capable of contacting said applicator pad, so that said applicator assembly is operable for applying a portion of said chemical substance to said selected portions of plants when a liquid solvent for said said form of said chemical substance is applied to said applicator pad so that said chemical substance is capable of being transferred to said applicator pad and then applied to said selected portions of the plants.

2. The hand-operated applicator assembly as claimed in claim 1, wherein said solid form of said chemical substance is in the form of a solid bar mounted to a distal portion of said shield and disposed between the distal portion of said shield and said applicator pad.

3. The hand-operated applicator assembly as claimed in claim 2, wherein said solid bar is removably mounted to said distal portion of said shield.

4. The hand-operated applicator assembly as claimed in claim 3, wherein said solid bar is mounted on a flat planar base which is received in a complementary slot formed in said distal portion of said shield.

5. A hand-operated applicator assembly for applying herbicide to selected portions of plants, said applicator assembly comprising a pair of tongs including adjacent first and second elongated members having respective first and second distal portions, solid herbicide disposed between said elongated members and mounted to said first distal portion, and an absorbent applicator pad disposed between said elongated members and mounted to said second distal portion so as to be capable of contacting said solid herbicide and thereafter contacting selected portions of plants brought between said elongated members, so that said hand-operated applicator assembly is operable for applying a portion of said herbicide to said selected portions of plants when a liquid solvent for said solid herbicide is applied to said applicator pad for transferring a portion of said herbicide to said pad and thereafter transferring a portion of said herbicide from said pad to said selected portions of plants.

6. The hand-operated applicator assembly as claimed in claim 5, wherein said solid herbicide is in the form of a solid bar.

7. The hand-operated applicator assembly as claimed in claim 6, wherein said solid bar is removably mounted to said first distal portion.

8. The hand-operated applicator assembly as claimed in claim 7, wherein said solid bar is mounted on a flat planar base which is received in a complementary slot formed in said first distal portion.

9. A hand-operated applicator assembly for applying a chemical substance to selected portions of plants, said applicator assembly comprising:

at least one holder for grasping by a human hand, an applicator pad for applying said chemical substance by contact with said selected portions of plants, said applicator pad being mounted to a distal portion of said holder, and a shield connected to said holder and disposed adjacent to said applicator pad, wherein said pad is disposed between said shield and said distal portion of said holder, and said shield is moveable with respect to said pad to permit variation in the spacing between said shield and said pad to define an application zone between said shield and pad for accepting said selected portions of plants, and wherein said applicator pad has a beveled tip portion for guiding said selected portions of plants into said application zone.

* * * * *